Figure 1:

United States Patent [19]

Mauro et al.

[11] 4,278,776

[45] Jul. 14, 1981

[54] VULCANIZABLE MIXES BASED ON FLUOROELASTOMERS AND COMPRISING ELASTOMERIC FLUOROPOLYAMIDES AS PROCESSING AIDS

[75] Inventors: Gastone Mauro; Carlo Lagana; Sergio Geri, all of Milan; Ezio Strepparola, Treviglio, all of Italy

[73] Assignee: Montedison S.p.A., Milan, Italy

[21] Appl. No.: 158,814

[22] Filed: Jun. 12, 1980

[30] Foreign Application Priority Data

Jun. 14, 1979 [IT] Italy ................................ 23572 A/79
Mar. 18, 1980 [IT] Italy ................................ 20731 A/80

[51] Int. Cl.$^3$ .............................................. C08L 77/00
[52] U.S. Cl. ................................. 525/178; 260/42.27; 528/335
[58] Field of Search .......................................... 525/178

[56] References Cited

U.S. PATENT DOCUMENTS

| | | | |
|---|---|---|---|
| 2,975,128 | 3/1961 | Stott | 525/178 |
| 2,998,397 | 8/1961 | Riesing | 525/178 |
| 3,013,967 | 12/1961 | Miller | 525/178 |
| 3,294,871 | 12/1966 | Schmitt | 525/178 |
| 3,457,329 | 7/1969 | Silver | 525/178 |
| 3,826,774 | 7/1974 | Demillecamps | 525/178 |
| 3,876,617 | 4/1974 | Caporiccio | 260/47 CP |
| 3,908,038 | 9/1975 | Jienart | 525/178 |

FOREIGN PATENT DOCUMENTS 19203 of 1979 Italy.
1522748 8/1978 United Kingdom.

*Primary Examiner*—Paul Lieberman

[57] ABSTRACT

Vulcanizable mixes based on elastomeric copolymers of vinylidene fluoride with fluorinated or chlorofluorinated olefins, or with fluorinated vinyl ethers, and which comprise, as processing aid, at least one fluorinated polyamide, are disclosed.

5 Claims, 3 Drawing Figures

VULCANIZABLE MIXES BASED ON FLUOROELASTOMERS AND COMPRISING ELASTOMERIC FLUOROPOLYAMIDES AS PROCESSING AIDS

BACKGROUND OF THE INVENTION

With the development of research on, and commercial use of, the elastomeric copolymers of vinylidene fluoride with fluorinated or chlorofluorinated olefins, or with fluorinated vinyl ethers, certain well-defined requirements have become increasingly critical. These include:

a general improvement of the rheological characteristics and processability (workability) of the mixes based on said elastomeric copolymers;

the possibility of obtaining, from the mixes, relatively soft manufactured articles, i.e., articles having a hardness lower than 55 IRHO; and easy extrusion of the mixes to obtain manufactured articles having a complicated profile and, also, of considerable size.

It has been attempted to satisfy the latter-day requirements by resort to processing aids of the plasticizing type, or to various lubricants.

The processing assistants heretofore used for the purpose, such as polyesters, polyethylene, pentaerythritol tetrastearate, wax, and like agents did not prove suitable because they cause appreciable deterioration of the typical characteristics of the fluorinated elastomers.

In fact, in order to impart to the elastomers in question the well known properties of heat-resistance and resistance to fluids, it is indispensable to carry out a "heat stabilization" (post-vulcanization) at temperatures comprised between 200° C. and 250° C., over a period of about 24 hours.

During this operation, the standard plasticizing agents (e.g., glycols, stearates, organic phosphates, oleates, phtalates, etc.), volatilize and/or decompose. This causes a considerable deterioration of the mechanical properties of the manufactured end products. In particular, it has the following effects on the end products:

an excessive increase in hardness;

a decrease in the resistance to the permanent set under compression ("compression set");

a decrease in the elasticity characteristics (low value of the elongation and high value of the elasticity coefficient);

poor thermal resistance which hinders its use under severe application conditions, i.e., at temperatures higher than 180° C.

Summing up, it may be said that the benefits achievable in the processing stage lead to unacceptable disadvantages in the finished products.

Thus, the use of plasticizers and lubricants is limited to small quantities (1–3 p. by w./100 p. rubber) that do not appreciably alter the final properties of the vulcanized products, but which, on the other hand, are insufficient to satisfy the requirements mentioned above.

In particular, it has been noticed that the use of perfluorosilicon oils results in reduction of the hardness of a product by 4–5 points, that is, down to the lowest limit of 50 IRDH, although it presents difficulties in admixing and incorporating said oils into the fluoro-elastomers.

Moreover, there occurs a drop in vulcanization rate and a worsening of the compression set value and the resistance to heat.

The use of very low molecular weight fluorinated polymers, having the consistency of waxes, such as: "Viton LM", produced by Du Pont, was adopted in order to impart to the molecules better rheological characteristics, particularly during extrusion. It is thus possible to obtain extruded articles of great dimensions and with a complicated profile. However, the use of such a "plasticizer", in a ratio of 10 to 20 parts by weight for 100 parts of fluoro-elastomer, has the following disadvantages:

it is possible only with polyamine-based conventional vulcanizing systems, while it is not compatible with more recent vulcanizing systems based on bisphenols and accelerators incorporated in the fluoro-elastomers; and it causes slowing down of the vulcanization, which necessitates increase of the dwell time in the press.

THE PRESENT INVENTION

One object of this invention is to provide new compositions based on fluoro-elastomers and comprising processing acids which do not have the aforesaid drawbacks of the processing acids or assistants for the fluoroelastomers known heretofore.

This and other objects, which will become apparent to those skilled in the art from the description which follows, are achieved by this invention in accordance with which it has been found that the drawbacks and disadvantages associated with the use of the processing aids known up to now can be avoided by mixing polyamides derived from perfluoro-polyethers with the fluoro-elastomer, as processing aids or assistants therefor.

The polyamides, derived from aliphatic or aromatic bi-functional amines, have a structure formed by repeating or recurring units represented by the formula:

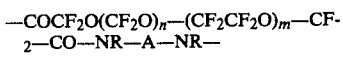

in which $CF_2O$ and $CF_2CF_2O$ are oxy-perfluoroalkylene units which are present contemporaneously and distributed statistically along the chain;

n and m are integers comprised between 2 and 100;

the sum of n+m is a number comprised between 5 and 200, preferably between 15 and 100;

the m/n ratio is comprised between 0.2 and 1.5, preferably between 0.3 and 1.2;

A is a bivalent organic radical selected from the following:

(a) alkenyls containing from 2 to 20 carbon atoms, preferably from 6 to 12 carbons, and which may have alkyl substituents of 1 to 6 carbon atoms in the main chain;

(b) cycloalkenyls containing from 5 to 10 carbon atoms, and which may have alkyl substituents of 1 to 6 carbon atoms;

(c) heterocyclic radicals with a ring of 5 or 6 atoms;

(d) arylene or alkylarylene radicals with one or more benzene rings, in which the rings may be linked to each other by O or S atoms or by: —CO—, —SO—, —NH—, —SO$_2$— or alkenyl groups of 1 to 3 carbon atoms, and wherein R is selected from the group comprising hydrogen or alkyl or phenyl group.

The polyamides as defined above and obtained from derivatives of perfluorinated ethers are amply described in U.S. Pat. No. 3,876,617 assigned to Montedison S.p.A.. Said patent also describes the preparation of the polyamides in question by polycondensation of bi-functional amines with polyoxyperfluoroalkandioic acids of the formula:

$$HOOC-CF_2O(CF_2CF_2O)_m-(CF_2O)_n-CF_2COOH$$

in admixture with a certain quantity of the corresponding monocarboxylic acids containing an inactive terminal group of the type: $-OCF_3$, $-OCF_2Cl$.

The mixture has a degree of functionality comprised between 1.4 and 1.99.

In practicing this invention, the fluorinated polyamides are used as process-assisting agents for fluorinated elastomers in a quantity of from 5 to 15 parts by weight per 100 parts of elastomer.

The fluorinated polyamides best suited for use in practicing this invention are those having an inherent viscosity comprised between 0.1 and 0.6 (dl/g), determined on a 0.3% polyamide solution in a solvent mixture of 1,1,2-trichlorotrifluoro-ethane and dimethylformamide at 20° C., with a Desreux-Bishoff type free-fall viscosimeter. This inherent viscosity is defined by the relationship: $\eta_{inher.} = 1/C \ln t/t_o$ wherein C is the concentration of the solute expressed in g/dl, t and $t_o$ are the defluxion times of equal volumes of solvent and solution in the capillary of the viscosimeter.

In general, greater quantities of fluorinated polyamide in the mix are needed whenever polyamides of high viscosity are used.

The polyamides as defined herein show a high mixability and compatibility with fluorinated elastomers and they do not alter the latters' thermal and chemical resistance characteristics. Moreover, they result in mixes of a high degree of extrudability and permit the manufacture of formed or extruded articles with a low hardness value (about 43 IRDH). In addition, they are perfectly compatible with the vulcanizing systems presently in use, inclusive of those of a nucleophile nature of the bisphenol type.

The fluorinated polyamides in question are particularly useful as additives for vulcanizable elastomeric compositions based on copolymers of vinylidene fluoride with other fluorinated or chlorofluorinated olefins or with perfluorinated vinyl ethers.

We have also found that particularly advantageous results with regard to the mechanical properties at very low temperatures of the vulcanisates are obtained by using together perfluoropolyamide and a mixture consisting of perfluoropolyethers of an oily consistency and of polytetrafluoroethylene in powder form.

The mixture of perfluoropolyether and polytetrafluoroethylene having the consistency of a fatty lubricant is obtained by thoroughly mixing together a polytetrafluoroethylene of a mean granulometric size comprised between 0.1 and 4 microns, preferably between 0.2 and 2 microns, in quantities equal to 15–40 parts by weight, preferably 20–35 parts by weight, per 100 parts b.w. of the mixture, with a perfluoropolyether having the following structure:

$$X-O-(CF_2-CF-O)_n-(CF_2O)_m-Y$$
$$\phantom{X-O-(CF_2-}|$$
$$\phantom{X-O-(CF_2-}CF_3$$

wherein:

n is an integer comprised between 30 and 100;
m is an integer comprised between 1 and 5;
n/m is comprised between 20 and 40; and
X and Y, equal to or different from each other, are perfluoroalkyl radicals selected from those containing from 1 to 3 carbon atoms,
and having the consistency of liquids with a viscosity comprised between 1,000 and 10,000 C. stokes, corresponding to a mean molecular weight of between 5,000 and 15,000.

Products of this type are on the market under the name of "Fomblin" Series Y, produced by Montedison.

Other suitable products are those of the following structure:

$$X-O-(CF_2CF_2O)_p-(CF_2O)_q-Y$$

wherein:

X and Y are perfluoroalkyl radicals containing from 1 to 2 carbon atoms;
p is comprised between 60 and 1,600;
q is comprised between 100 and 2,700; and
p/q is comprised between 0.3 and 1.2,
and which have a viscosity comprised between 500 and 30,000 C. stokes and a mean molecular weight of between 20,000 and 270,000. Products of this type are those to be found on the market under the name of "Fomblin Series Z" produced by Montedison.

The perfluoropolyethers to be used according to this invention must be free of volatile compounds and have a very low vapor pressure corresponding to a value of less than $10^{-13}$ Torr at 20° C.

Perfluoropolyethers of the last-mentioned type, suitable for use according to this invention, are described in British Pat. No. 1522748 and Italian Pat. No. 19,203 A/79.

The material, having the consistency of a lubricating grease, and consisting of the polytetrafluoroethylene/perfluoropolyether mixture described above, is additioned with an elastomer in quantities corresponding to 2–7 parts by weight per 100 parts b.w. of elastomer.

The additives according to the invention, and having the function of assisting the processing, allow to obtain mixes of a high extrudability as well as the manufacture of molded or extruded manufactured articles displaying a low hardness value (up to about 45 IRHD).

Moreover, they are perfectly compatible with the vulcanizing systems presently in use, inclusive of those of a nucleophile nature of the bisphenol type.

The mechanical characteristics of the vulcanized materials thus obtained are improved considerably at low temperatures in comparison with the vulcanizates obtainable from mixes of the fluoroelastomers and the usual additives.

The embrittlement temperature, determined according to the Brittle Point Test-ASTM D 746, may reach values of up to $-40°$ C. They may thus be used when the request is for silicon and fluorosilicon elastomers which, although possessing excellent resistance characteristics at very low temperatures, show, however, in comparison with fluorinated elastomers, a poor resistance to aggressive chemical agents and solvents, and little resistance to permanent set under compression ("compression set").

The following examples are given to illustrate embodiments within the scope of this invention, and are not intended to be limiting of its scope.

EXAMPLE 1

An elastomeric polyamide was synthesized by means of polycondensation of hexamethylendiamine with a mixture of fluorinated polyethers having as chain terminals carboxylic groups in the form of phenyl ester. The perfluorinated starting polyether had a mean molecular weight of about 1,950, a molar ratio $C_2F_3O/CF_2O$ equal to about 0.9 and a degree of functionality of about 1.9 (due to a certain content of monofunctional acids with neutral end groups such as: —$OCF_3$, —$OCF_2Cl$).

The reactants were loaded into a reactor, mixed in the cold state, and the mixture was then gradually heated to 130°–140° C., while simultaneously reducing the pressure until a vacuum of just a few mmHg was obtained. The total reaction time was about 10–16 hours.

The polycondensate thus obtained, at room temperature displayed a gummy consistency and had a low toughness and an inherent viscosity $[dl/g] = 0.27$. The inherent viscosity was determined on a solvent mixture of 1,1,2-trichloro-trifluoroethane and N,N-dimethylformamide (ratio by volume 4:1), at 20° C. The inherent viscosity is defined by the relationship: $\eta_{inher.} = 1/C \ln t/t_o$ wherein: C is the concentration in dissolved substance expressed in g/dl; t and $t_o$ are downflow times of equal volumes of solvent and solution in the capillary of the Desreux-Bishoff type free-fall viscosimeter.

The polycondensate as such, at 150° C. showed a viscosity of the order of $10^5$ centipoises.

It was used as an ingredient of vulcanizable fluoroelastomeric mixes.

The compositions of the mixes and the results of the vulcanizations are recorded in Table I as Tests Nos. 3 and 6, and in Table II as Tests Nos. 4, 5, 7 and 8 respectively.

For comparative purposes there have been recorded a set of tests with mixes free of process-assisting agents (Table I: Tests 1 and 4; Table II: Tests 3 and 5) and tests with process-assisting agents of the prior art (Table I: Tests 2 and 5; Table II: Tests 1 and 2).

The following ingredients were used in the mixes:

"Tecnoflon" NM (Montedison):
  Elastomeric copolymer of vinylidene fluoride with hexafluoropropene, in a molar ratio of 4:1, having a Mooney ML viscosity (1+4) at 100° C. = 85, and a specific weight (specific gravity) at 25° C. = 1.81 g/cu.cm.

"Viton" B (DuPont):
  Elastomeric copolymer of vinylidene fluoride/hexafluoropropene/tetrafluoroethylene, in a ratio of 60:20:20, and with a specific weight of 1.86, and a Mooney viscosity = 130.

"Tecnoflon" FOR 70 (Montedison):
  Elastomeric copolymer like "Tecnoflon" NM, and containing, also, an incorporated vulcanizing accelerating system.

"Viton" E 60-C (DuPont):
  Elastomeric copolymer of vinylidene fluoride and hexafluoropropene, with an incorporated vulcanizing-accelerating system. The Mooney viscosity was = 60; the specific weight = about 1.82.

"Viton" LM (DuPont):
  Elastomeric copolymer of vinylidene fluoride with hexafluoropropene, of low molecular weight. Brookfield viscosity at 100° C. was equal to 2,000 c.poises; specific weight = 1.72.

"Maglite" D: magnesium oxide;

"Ca(OH)$_2$-VE": calcium hydrate (commercial trademark of Sturge Ltd., England);

"Tecnocin" A (Montedison): Shiff base from cinnamic aldehyde and hexamethylendiamine.

EXAMPLE 2

An elastomeric polyamide was synthesized by polycondensation of 2,4-toluendiamine with a mixture of fluorinated polyethers having as chain terminals carboxylic groups in the form of phenyl esters.

The starting perfluorinated polyether has a mean molecular weight of about 2,000, a molar ratio $C_2F_4O/CF_2O$ equal to about 1, and a degree of functionality of 1.97 (due to a certain content of monofunctional acids, that is, with a neutral terminal group).

Operating as in Example 1, there was obtained a polycondensate which, at room temperature, had a gummy consistency of low toughness. The polycondensate, at 150° C., showed an inherent viscosity of about $10^5$ c.poises. The inherent viscosity, determined on the solution of 0.3% in the mixed solvents dimethylformamide and 1,1,2-trichloro-trifluoro-ethane (in a volumetric ratio of 1:9), was $[dl/g] = 0.35$. The definition of "inherent viscosity" and the measuring method are described in Example 1.

The polycondensate was used as an ingredient in vulcanizable fluoroelastomeric mixes. The compositions of the mixes and the results of the vulcanization are recorded in Table III, as Tests 3 and 6; in Table IV as Tests 4, 6 and 7.

For comparative purposes, there are reported tests with mixes free of process-assisting agents (Table III: Tests 1 and 4; Table IV: Tests 3 and 5) and tests with process-assisting agents of the prior art (Table III: Tests 2 and 5; Table IV: Tests 1 and 2).

Figure 2:
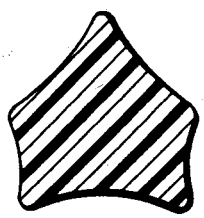
Figure 3:
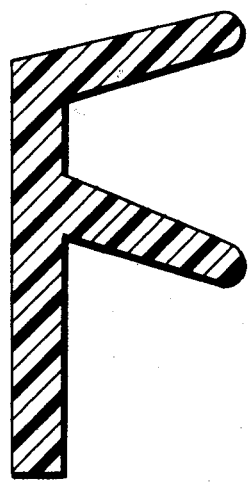

In the Tables, the data on the swelling and the aspect of the extruded products are relevant to extruded articles having cross-sections as shown in FIGS. 1, 2 and 3 of the accompanying drawing (scale = 2:1).

TABLE I

| Fluoroelastomers vulcanized with conventional aminic systems | | | | | | |
|---|---|---|---|---|---|---|
| MIXES: TEST N° | 1 | 2 | 3 | 4 | 5 | 6 |
| Tecnoflon MN | 100 | 100 | 100 | — | — | — |
| Viton B | — | — | — | 100 | 100 | 100 |
| Tecnoflon FOR 70 | — | — | — | — | — | — |
| Viton E 60 - C | — | — | — | — | — | — |
| Viton LM | — | 10 | — | — | 10 | — |
| Fluoroaliphatic rubber | — | — | 10 | — | — | 10 |
| Fluorosilicone FS 1265 oil | — | — | — | — | — | — |
| Maglite D | 15 | 15 | 15 | 15 | 15 | 15 |
| Ca(OH)$_2$ - VE | — | — | — | — | — | — |

TABLE I-continued

Fluoroelastomers vulcanized with conventional aminic systems

| MIXES: TEST N° | 1 | 2 | 3 | 4 | 5 | 6 |
|---|---|---|---|---|---|---|
| Carbonblack MT | — | — | — | — | — | — |
| Tecnocin A | 3 | 3 | 3 | 3 | 3 | 3 |

Vulcanization conditions: Press 170° C. × 10-20 min. oven at 250° C. × 24 hours.

| Mechanical Properties: | | | | | | |
|---|---|---|---|---|---|---|
| Elasticity modulus 100% Kg/cm$^2$ | 18 | 20 | 12 | 16 | 11 | 15 |
| Breaking load 100% Kg/cm$^2$ | 150 | 155 | 140 | 130 | 120 | 110 |
| Elongation 100% Kg/cm$^2$ | 300 | 300 | 375 | 340 | 360 | 350 |
| Shore A hardness | 59 | 50 | 58 | 59 | 57 | 57 |
| IRHD hardness | 53 | 55 | 53 | 53 | 53 | 53 |
| Thermal resistance: | | | | | | |
| 275° × 70 hours | | | | | | |
| Modulus 100% variation, % | +15 | +20 | +20 | °25 | +21 | +19 |
| Load 100% variation, % | −9 | −10 | −8 | −11 | −9 | −7 |
| Elongation variation, % | −13 | −15 | −15 | −16 | −18 | −16 |
| Hardness variation, points | +5 | +5 | +6 | +5 | +6 | +6 |
| Loss of weight: % | −6 | −5.5 | −8 | −7 | −10 | −9 |
| Compression set, B, % | | | | | | |
| 200° C. × 70 hours | 45 | 46 | 52 | 48 | 49 | 49 |
| on O-rings 3.53 mm. | | | | | | |
| Cross-section of FIG. 1 | | | | | | |
| (1) swelling of the extruded product % | 18 | 19 | 8 | 7 | 6 | 6 |
| (2) aspect of the extruded product | 1 | 1 | 3 | 3 | 5 | 5 |
| Cross-section of FIG. 2 | | | | | | |
| (1) Swelling of the extruded product % | 52 | 50 | 41 | 40 | 25 | 20 |
| (2) aspect of the extruded prod. | 2 | 2 | 7 | 6 | 6 | 6 |
| Cross-section of FIG. 3 | | | | | | |
| (1) Swelling of the extruded product % | 35 | 35 | 25 | 23 | 17 | 16 |
| (2) Aspect of extruded prod. | 1 | 1 | 5 | 5 | 6 | 6 |

NOTE:
(1) The swelling of the extruded product is given by the increase in cross-section of the same extruded product with respect to the nozzle, after vulcanization in the autoclave.
(2) There are taken into consideration the general aspect of the extruded product, the possible formation of an orange peel and cracks in correspondence with sharp angles. The indicated number expresses the qualitative value of these characteristics. The best characteristics correspond to value 10.

TABLE II

Fluoroelastomers with incorporated vulcanizing/accelerating system

| MIX: TEST n° | 1 | 2 | 3 | 4 | 5 | 6 |
|---|---|---|---|---|---|---|
| Tecnoflon NM | — | — | — | — | — | — |
| Viton B | — | — | — | — | — | — |
| Techoflon FOR 70 | 100 | — | 100 | 100 | 100 | 100 |
| Viton E 60 | — | 100 | — | — | — | — |
| Viton LM | 10 | 10 | — | — | — | — |
| Fluro-aliphatic rubber | — | — | — | 10 | — | 10 |
| Maglite D | 5 | 3 | 3 | 3 | 5 | 5 |
| Ca(OH)$_2$ - VE | 5 | 6 | 2 | 2 | 5 | 5 |
| Carbonblack MT | — | — | — | — | 25 | 25 |
| Tecnocin A | — | — | — | — | — | — |

Vulcanization conditions. Press at 170° C. × 10-20 minutes; oven at 250 C. × 24 hours.

| Mechanical Properties. | | | | | | |
|---|---|---|---|---|---|---|
| Elasticity modulus 100%, Kg/cm$^2$ | Does NOT VUL-CANIZE | DOES NOT VUL-CANIZE | 20 | 18 | 60 | 41 |
| Breaking load 100%, Kg/cm$^2$ | | | 120 | 115 | 160 | 125 |
| Elongation 100%, Kg/cm$^2$ | | | 280 | 305 | 205 | 210 |
| Shore A hardness | | | 57 | 50 | 74 | 71 |
| IRHD hardness | | | 53 | 48 | 71 | 85 |
| Thermal resistance: | | | | | | |
| 275° C. × 70 hours | | | | | | |
| Modulus 100% variation, % | | | 0 | +15 | −6 | +17 |
| Load 100% variation, % | | | −3 | −12 | −16 | +2 |
| Elongation 100% variation, % | | | +11 | −19 | +13 | −17 |
| Hardness 100% variation, points | | | 0 | +2 | 0 | +5 |
| Loss of weight % | | | −5.5 | −10 | −4 | −9 |
| Compression-set, B, % | | | | | | |
| 200° C. × 70 hours | | | 18 | 21 | 18 | 19 |
| on O-rings 3.53 mm | | | | | | |
| Cross-section of FIG. 1 | | | | | | |
| (1) Swelling of extruded product % | | | 13 | 7 | 9 | 6 |

TABLE II-continued

| Fluoroelastomers with incorporated vulcanizing/accelerating system | | | | | | |
|---|---|---|---|---|---|---|
| MIX: TEST n° | 1 | 2 | 3 | 4 | 5 | 6 |
| (2) Aspect of extruded product | | | 1 | 5 | 3 | 5 |
| Cross-section of FIG. 2 | | | | | | |
| (1) Swelling of extruded product % | | | 45 | 25 | 24 | 20 |
| (2) Aspect of extruded product | | | 3 | 6 | 5 | 7 |
| Cross-section of FIG. 3 | | | | | | |
| (1) Swelling of extruded prod. % | | | 32 | 21 | 16 | 20 |
| (2) Aspect of extruded product | | | 1 | 5 | 4 | 5 |

NOTE:
(1) The swelling of the extruded product is due to the increase of the cross-section with respect to the nozzle after vulcanization in an autoclave.
(2) The following points have been taken into consideration: the general aspect of the extruded product, possible formation of an orange peel and cracks in correspondence with sharp angles. The number indicated on the table expresses the qualitative value of these characteristics. These characteristics at their best correspond to value 10.

TABLE III

| Fluoroelastomers vulcanized with conventional aminic systems | | | | | | |
|---|---|---|---|---|---|---|
| MIX: TEST n° | 1 | 2 | 3 | 4 | 5 | 6 |
| Tecnoflon NM | 100 | 100 | 100 | — | — | — |
| Viton B | — | — | — | 100 | 100 | 100 |
| Tecnoflon FOR 70 | — | — | — | — | — | — |
| Viton E 60 C | — | — | — | — | — | — |
| Viton LM | — | 10 | — | — | 10 | — |
| Fluoroaromatic rubber | — | — | 10 | — | — | 10 |
| fluorosilicon FS 1265 oil | — | — | — | — | — | — |
| Maglite D | 15 | 15 | 15 | 15 | 15 | 15 |
| Ca(OH)$_2$ - VE | — | — | — | — | — | — |
| Carbonblack MT | — | — | — | — | — | — |
| Tecnocin A | 3 | 3 | 3 | 3 | 3 | 3 |

Vulcanization conditions. Press at 170° C. × 10-20 minutes, in oven at 250° C. × 24 hours.

| Mechanical Properties: | | | | | | |
|---|---|---|---|---|---|---|
| Elasticity modulus 100%, Kg/cm$^2$ | 16 | 19 | 8 | 15 | 10 | 18 |
| Breaking load 100%, Kg/cm$^2$ | 155 | 150 | 130 | 130 | 120 | 100 |
| Elongation 100%, Kg/cm$^2$ | 370 | 390 | 400 | 350 | 350 | 380 |
| Shore A hardness | 59 | 50 | 56 | 60 | 56 | 56 |
| IRHD hardness | 54 | 55 | 51 | 55 | 52 | 52 |
| Thermal Resistance: | | | | | | |
| at 275° C. × 70 hours: | | | | | | |
| Modulus 100% variation, % | +15 | +20 | +25 | +23 | +20 | +18 |
| Load variation, % | −9 | −12 | −11 | −7 | −9 | −7 |
| Elongation variation, % | −15 | −14 | −16 | −16 | −8 | −17 |
| Hardness var., points | +6 | +7 | +4 | +5 | +5 | +6 |
| Loss of weight % | −8 | −9 | −10 | −8 | −7 | −8 |
| Compression-set, B, % | | | | | | |
| at 200° C. × 70 hours | 45 | 48 | 50 | 46 | 47 | 49 |
| on O-rings 3.53 mm | | | | | | |
| Cross-section of FIG. 1 | | | | | | |
| (1) Swelling of extruded prod. in % | 18 | 19 | 8 | 7 | 6 | 6 |
| (2) Aspect of extruded prod. | 1 | 1 | 3 | 3 | 3 | 5 |
| Cross-section of FIG. 2 | | | | | | |
| (1) Swelling of extruded prod. % | 52 | 50 | 41 | 40 | 25 | 20 |
| (2) Aspect of extruded prod. | 2 | 2 | 7 | 6 | 6 | 6 |
| Cross-section of FIG. 3 | | | | | | |
| (1) Swelling of extruded prod. % | 35 | 35 | 25 | 23 | 17 | 16 |
| (2) Aspect of extruded product | 1 | 1 | 5 | 5 | 6 | 6 |

NOTE:
(1) The swelling of the extruded product is due to the increase in the cross-section with respect to the nozzle after vulcanizing in the autoclave.
(2) There are considered: the general aspect of the extruded product, the possible formation of an orange peel and of cracks in correspondence with the sharp angles. The number indicated in the Table expresses the qualitative global value of these characteristics. The best characteristics correspond to value 10.

TABLE IV

| Fluoroelastomers with vulcanizing/accelerating system incorporated in it | | | | | | | |
|---|---|---|---|---|---|---|---|
| MIX: TEST n° | 1 | 2 | 3 | 4 | 5 | 6 | 7 |
| Tecnoflon MN | — | — | — | — | — | — | — |
| Viton B | — | — | — | — | — | — | — |
| Tecnoflon FOR 70 | 100 | — | 100 | 100 | 100 | 100 | 100 |
| Viton E 60 - C | — | 100 | — | — | — | — | — |
| Viton LM | 10 | 10 | — | — | — | — | — |

TABLE IV-continued

Fluoroelastomers with vulcanizing/accelerating system incorporated in it

| MIX: TEST n° | 1 | 2 | 3 | 4 | 5 | 6 | 7 |
|---|---|---|---|---|---|---|---|
| Fuoroaromatic rubber | — | — | — | 10 | — | 10 | 5 |
| Maglite D | 5 | 3 | 3 | 3 | 5 | 5 | 5 |
| Ca(OH)$_2$ VE | 5 | 6 | 2 | 2 | 5 | 5 | 5 |
| Carbonblack MT | — | — | — | — | 25 | 25 | 25 |
| Tecnocin A | — | — | — | — | — | — | — |

Vulcanization conditions: Press at 170° C. × 10-20 minutes, oven at 250° C. × 24 hours.

| Mechanical properties: | | | | | | | |
|---|---|---|---|---|---|---|---|
| Elasticity modulus 100%, Kg/cm$^2$ | DOES NOT VULCANIZE | DOES NOT VULCANIZE | 20 | 16 | 58 | 50 | 60 |
| Breaking load 100%, Kg/cm$^2$ |  |  | 120 | 110 | 150 | 120 | 140 |
| Elongation 100%, Kg/cm$^2$ |  |  | 270 | 320 | 200 | 220 | 200 |
| Shore A hardness |  |  | 57 | 50 | 73 | 71 | 73 |
| IRHD hardness |  |  | 53 | 47 | 70 | 68 | 70 |
| Thermal resistance: | | | | | | | |
| at 275° C. × 70 hours | | | | | | | |
| El. modulus 100% variation, % |  |  | 0 | +10 | +8 | +7 | +7 |
| Br. load 100% variation, % |  |  | −10 | −12 | −6 | −8 | −18 |
| Elongation 100% variation, % |  |  | −13 | −12 | −15 | −17 | −17 |
| Hardness 100% variation, points |  |  | 0 | +1 | +1 | +3 | +3 |
| Loss of weight in % |  |  | −5 | −10 | −4 | −8 | −6 |
| Compression-set, B, % | | | | | | | |
| at 200° C. × 70 hours |  |  | 18 | 20 | 19 | 19 | 19 |
| on O-rings 3.53 mm | | | | | | | |
| Cross-section of FIG. 1 | | | | | | | |
| (1) Swelling of extruded prod. % |  |  | 13 | 7 | 9 | 6 | 7.6 |
| (2) Aspect of extruded prod. |  |  | 1 | 5 | 3 | 5 | 5 |
| Cross-section of FIG. 2 | | | | | | | |
| (1) Swelling of extruded prod. % |  |  | 45 | 25 | 24 | 20 | 20 |
| (2) Aspect of extruded product |  |  | 3 | 6 | 5 | 7 | 7 |
| Cross-section of FIG. 3 | | | | | | | |
| (1) Swelling of extruded prod. % |  |  | 32 | 21 | 20 | 16 | 16 |
| (2) Aspect of extruded product |  |  | 1 | 5 | 4 | 5 | 5 |

NOTE:
(1) The swelling of the extruded product is given by the increase of the cross section with respect to the nozzle after vulcanization in an autoclave.
(2) There are considered the general aspect of the extruded product, the possible formation of orange peel and cracks in correspondence with sharp angles. The indicated numbers express the global quality of these characteristics. The best characteristics correspond to the value 10.

EXAMPLE 3

The elastomeric perfluoropolyamide described in Example 1 was used as an ingredient in vulcanizable fluoroelastomeric mixes, in combination with "Fomblin Grease" consisting of a mixture of 30 parts b.w. of polytetrafluoroethylene having a granulometric size distribution comprised between 0.2 and 4 microns, and of 70 parts b.w. of "Fomblin" type "Y 114/13" (perfluoropolyether with a viscosity of 1,400–1,600 c.stokes and structure

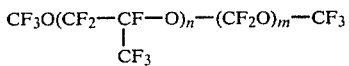

with n/m=40). The compositions of the mixes and the results of the vulcanization are recorded in Table V, Tests 5 and 8.

For comparison purposes there are given, also, tests with mixes free of process-assisting agents (Tests 3 and 6) and tests with process-assisting agents of the prior art (Tests 1 and 2) or with perfluoropolyamide only (Tests 4 and 7). The ingredients used in the mixes were:
"Tecnoflon" NM (Montedison)
"Viton" B (DuPont)
"Tecnoflon FOR 70" (Montedison)
"Viton LM" (DuPont)
"Maglite" D
"Ca(OH)$_2$-VE"
"Tecnocin A" (Montedison)

EXAMPLE 4

The elastomeric perfluoropolyamide described in Example 2, was used as an ingredient in vulcanizable fluoroelastomeric mixes in combination with "Fomblin Grease" of the type used in Example 3. The compositions of the mixes and the results of the vulcanization are recorded in Table VI, Tests 3 and 6.

For comparative purposes, there are also reported tests with mixes free of process-assisting agents (Tests 1 and 4) and tests with process-assisting agents of the prior art (Tests 2 and 5).

EXAMPLE 5

Using the perfluorinated polyamide of Example 1 and "Fomblin Grease" as process-assisting agents, there was prepared a vulcanizable mix with a fluoroelastomer having a vulcanizing system incorporated therein.

The results obtained with this mix are recorded in Table VII under Test 2. For comparative purposes, there are also reported the results with mixes free of process-assisting agents (Test 1) and with an elastomer of the prior art (Test 3), that is, Silastic LS 43U, a fluorosiliconic rubber of Dow Corning Company.

As evidenced by the results reported in the table, the mix according to this invention, with respect to a conventional Tecnoflon FOR 70, shows a brittleness temperature of about 15° C. lower, and practically maintains unaltered both the mechanical as well as the chemical resistance properties. As far as the resistance to chemical agents and solvents is concerned, the corresponding values are by far superior to those of Silastic LS 43U.

TABLE V

Fluoroelastomers with incorporated a vulcanizing/accelerating system

| MIX TEST N° | 1 | 2 | 3 | 4 | 5 | 6 | 7 | 8 |
|---|---|---|---|---|---|---|---|---|
| Tecnoflon FOR 70 | 100 | — | 100 | 100 | 100 | 100 | 100 | 100 |
| Viton E 60 - C | — | 100 | — | — | — | — | — | — |
| Viton LM | 10 | 10 | — | — | — | — | 10 | 10 |
| Fluoroaliphatic rubber | — | — | — | 10 | 10 | — | 10 | 10 |
| Fomblin Grease | — | — | — | — | 5 | — | — | — |
| Maglite | 5 | 3 | 3 | 3 | 3 | 5 | 5 | 5 |
| Ca(OH)$_2$ - VE | 5 | 6 | 2 | 2 | 4 | 5 | 5 | 5 |
| Carbonblack MT | — | — | — | — | — | 25 | 25 | 25 |
| Tecnocin A | — | — | — | — | — | — | — | — |

Vulcanization conditions: Press 170° C. × 10–20 minutes; oven at 250° C. × 24 hours.

| Mechanical Properties: | | | | | | | | |
|---|---|---|---|---|---|---|---|---|
| Elasticity modulus 100% Kg/cm$^2$ | | | 20 | 18 | 12 | 60 | 41 | 30 |
| Breaking load 100% Kg/cm$^2$ | | | 120 | 115 | 104 | 160 | 125 | 136 |
| Elongation | | | 280 | 305 | 312 | 205 | 210 | 249 |
| Shore A hardness | | | 57 | 50 | 46 | 74 | 71 | 67 |
| IRHD hardness | | | 53 | 48 | 44 | 71 | 68 | 63 |
| Thermal Resistance: | | | | | | | | |
| 275° C. × 70 hours | | | | | | | | |
| Modulus 100% variation, % | | | 0 | +15 | +3 | −6 | +17 | +5 |
| Load 100% variation, % | | | −3 | −12 | −4 | −16 | +2 | +5 |
| Elongation variation, % | | | +11 | −19 | −13 | +13 | −17 | −11 |
| Hardness variation, % | | | 0 | +2 | +3 | 0 | +5 | +6 |
| Loss of weight, % | | | −5.5 | −10 | −10 | −4 | −9 | −9 |
| Compression set, B, % | | | | | | | | |
| 200° C. × 70 hours | | | 18 | 21 | 20 | 18 | 19 | 20 |
| on O-rings 3.53 mm. | | | | | | | | |
| Cross-section of FIG. 1 | | | | | | | | |
| (1) swelling of the extruded product % | | | 13 | 7 | 4 | 9 | 6 | 2 |
| (2) aspect of the extruded product | | | 1 | 5 | 5 | 3 | 5 | 8 |
| Cross-section of FIG. 2 | | | | | | | | |
| (1) Swelling of the extruded product % | | | 45 | 25 | 25 | 24 | 20 | 10 |
| (2) Aspects of extruded prod. | | | 3 | 6 | 9 | 5 | 7 | 9 |
| Cross-section of FIG. 3 | | | | | | | | |
| (1) Swelling of extruded product % | | | 32 | 21 | 11 | 16 | 20 | 11 |
| (2) Aspect of extruded prod. | | | 1 | 5 | 9 | 4 | 5 | 9 |

NOTE:
(1) The swelling of the extruded product is given by the increase in cross-section of said extruded product with respect to the nozzle, after vulcanization in an autoclave.
(2) There are taken into consideration the general aspect of the extruded product, the possible formation of an orange peel and of cracks in correspondence with sharp angles. The indicated number expresses the qualitative value of these characteristics. The best characteristics correspond to value 10.

TABLE VI

Fluoroelastomers vulcanized with traditional aminic systems

| MIX TEST N° | 1 | 2 | 3 | 4 | 5 | 6 |
|---|---|---|---|---|---|---|
| Tecnoflon N | 100 | 100 | 100 | — | — | — |
| Viton B | — | — | — | 100 | 100 | 100 |
| Viton LM | — | 10 | — | — | 10 | — |
| Fluoroaromatic rubber | — | — | 10 | — | — | 10 |
| Fomblin Grease | — | — | 5 | — | — | 5 |
| Maglite D | 15 | 15 | 15 | 15 | 15 | 15 |
| Tecnocin A | 3 | 3 | 3 | 3 | 3 | 3 |

Vulcanization conditions: Press at 170° C. × 10–20 minutes; oven at 250° C. × 24 hrs.

| Mechanical properties: | | | | | | |
|---|---|---|---|---|---|---|
| Elasticity modulus 100% Kg/cm$^2$ | 16 | 19 | 8 | 15 | 10 | 18 |
| Breaking load 100% Kg/cm$^2$ | 155 | 150 | 130 | 130 | 120 | 100 |
| Elongation 100% Kg/cm$^2$ | 370 | 390 | 400 | 350 | 350 | 380 |
| Shore A hardness | 59 | 50 | 51 | 60 | 56 | 56 |
| IRHD hardness | 54 | 55 | 46 | 55 | 52 | 52 |
| Thermal resistance: | | | | | | |
| 270° C. × 70 hours | | | | | | |
| Modulus 100% variation, % | +15 | +20 | +25 | +23 | +20 | +18 |
| Load variation, % | −9 | −12 | −11 | −7 | −9 | −7 |
| Elongation variation, % | −15 | −14 | −16 | −16 | −8 | −17 |
| Hardness variation, points | +6 | +7 | +4 | +5 | +5 | +6 |
| Loss of weight % | −8 | −9 | −10 | −8 | −7 | −8 |
| Compression-set, B, % | | | | | | |
| 270° C. × 70 hours | 45 | 48 | 50 | 46 | 47 | 49 |
| on O-rings of 3.35 mm. | | | | | | |

TABLE VI-continued

| Fluoroelastomers vulcanized with traditional aminic systems | | | | | | |
|---|---|---|---|---|---|---|
| MIX TEST N° | 1 | 2 | 3 | 4 | 5 | 6 |
| Cross-section of FIG. 1 | | | | | | |
| (1) Swelling of the extruded product % | 18 | 16 | 8 | 17 | 9 | 6 |
| (2) Aspect of extruded product | 1 | 2 | 8 | 1 | 4 | 8 |
| Cross-section of FIG. 2 | | | | | | |
| (1) Swelling of the extruded product % | 52 | 50 | 21 | 40 | 25 | 20 |
| (2) Aspect of extruded product | 2 | 2 | 8 | 6 | 6 | 8 |
| Cross-section of FIG. 3 | | | | | | |
| (1) Swelling of extruded product % | 35 | 35 | 15 | 33 | 19 | 16 |
| (2) Aspect of extruded product | 1 | 1 | 9 | 1 | 6 | 9 |

NOTE:
(1) The swelling of the extruded product is due to the increase of the cross-section with respect to the nozzle after vulcanization in the autoclave.
(2) There are considered the general aspect of the extruded product, the possible formation of an orange peel and of cracks in correspondence with sharp angles. The number indicated in the Table expresses the qualitative global value of these characteristics. The best characteristics correspond to value 10.

TABLE VII

| TEST N° | 1 | 2 | 3 |
|---|---|---|---|
| Silastic LS 43 | — | — | 100 |
| Tecnoflon FOR-70 | 100 | 100 | — |
| Maglite DE | 5 | 1.5 | — |
| Calcium hydroxide | 5 | 1.5 | — |
| Polyamide | — | 10 | — |
| Fomblin Grease | — | 5 | — |
| Luperco × 4100 (1) | — | — | 2 |
| Vulcanization: | | 170° C. × 10 min., press, at 220° C. × 24 hrs in oven | |
| Mechanical Properties at 24° C. | | | |
| Elasticity modulus 100%, Kg/cm² | 25 | 15 | 10 |
| Breaking load 100% Kg/cm² | 120 | 100 | 75 |
| Elongation % | 315 | 410 | 450 |
| Shore A hardness | 55 | 43 | 42 |
| Compression-set, B, % | | | |
| On O-rings, 3.53 mm thick | | | |
| 150° C. × 7 days | 21 | 22 | 55 |
| 200° C. × 3 days | 24 | 25 | 75 |
| Brittle Point ASTM D 746: in °C. | −21 | −36 | −58 |
| Chemical Resistance: | | | |
| in H₂SO₄ 96% | | | |
| 24° C. × 7 days | | | |
| Variation in volume, % | +1.8 | +2.1 | dissolved |
| in ASTM N° 3 (2) | | | |
| 200° C. × 3 days | | | |
| Variation in volume, % | +4.7 | +5.0 | 18 |
| in Stauffer Blend 7700 (3) | | | |
| 200° C. × 3 days | | | |
| Variation in volume, % | +22 | +23.2 | dissolved |
| in Perchloroethylene: | | | |
| 24° C. × 7 days | | | |
| Variation in volume, % | +1.2 | +1.6 | 12 |
| in Fuel C (4): | | | |
| 24° C. × 7 days | | | |
| Variation in volume, % | +5.5 | +6.3 | 24 |
| in Super Petrol: | | | |
| 24° C. × 7 days | | | |
| Variation in volume, % | +2.3 | +3.1 | 15 |

(1) Commercial trademark of Pennwalt (organic peroxide).
(2) Lubricating oil.
(3) Lubricating oil of the diester type.
(4) 50% toluene + 50% isooctane.

What is claimed is:

1. Vulcanizable mixes based on elastomeric copolymers of vinylidene fluoride with fluorinated or chlorofluorinated olefins or with fluorinated vinyl ethers, comprising, as processing aid, from 5 to 15 parts by weight, per 100 parts by weight of fluoroelastomer, of a fluorinated polyamide having a structure formed by recurring units represented by the formula:

—COCF$_2$O(CF$_2$O)$_n$—(CF$_2$CF$_2$O)$_m$—CF$_2$CO—N-R—A—NR— wherein:
the CF$_2$O and CF$_2$CF$_2$O units are distributed statistically along the chain;
m and n are integers comprised between 2 and 100;
the sum of n+m is a number comprised between 15 and 100;
the m/n ratio is comprised between 0.2 and 1.5;
A is a bivalent radical selected from the group consisting of alkenyl, cycloalkenyl, arylene, alkylarylene and heterocyclic radicals, and
R is selected from the group comprising hydrogen or an alkyl or phenyl group,
said fluorinated polyamide having an inherent viscosity comprised between 0.1 and 0.6 (dl/g), determined on a 0.3% solution of the polyamide in a mixture of 1,1,2-trichloro-trifluoroethane and dimethylformamide, at 20° C., with a Desreux-Bishoff type free-fall viscosimeter.

2. Vulcanizable mixes according to claim 1, in which the processing aid is from 1 to 7 parts by weight, per 100 parts by weight of fluoroelastomer, of a mixture of 15-40% by weight of polytetrafluoroethylene and of 85-60% by weight of perfluoropolyether having either one of the following structures:

$$X-O-(CF_2-CF(CF_3)-O)_n-(CF_2O)_m-Y \quad (I)$$

or $$X-O-(CF_2CF_2O)_p-(CF_2O)_q-Y \quad (II)$$

in which
X and Y are perfluoroalkyl radicals;
n is an integer comprised between 30 and 100;
m is an integer comprised between 1 and 5;
p is an integer comprised between 60 and 1,600; and
q is an integer comprised between 100 and 2,700,
the perfluoropolyether of formula (I) having a viscosity comprised between 1,000 and 10,000 c.stokes and the perfluoropolyether of formula (II) having a viscosity comprised between 500 and 30,000 c.stokes.

3. Vulcanizable mixes according to claim 1, and comprising vulcanizing agents of the type of biphenols and accelerating agents.

4. Manufactured articles based on vulcanized fluorinated elastomers obtained from the mixes of claims 1 and 2.

5. Manufactured articles based on vulcanized fluorinated elastomers obtained from the mixes of claim 2.

* * * * *